United States Patent Office 3,152,992
Patented Oct. 13, 1964

3,152,992
DELAYED ADDITION OF PHOSPHORUS TO ALUMINUM MELT IN THE PROCESS OF FORMING ALUMINUM PHOSPHIDE CRYSTALS
Albrecht Karl Heinrich Theodor Rabenau, Werner Kischio, and Hermann Georg Grimmeiss, all of Aachen, Germany, assignors to North American Philips Company, Inc., New York, N.Y., a corporation of Delaware
No Drawing. Filed Jan. 16, 1961, Ser. No. 82,721
Claims priority, application Germany Jan. 22, 1960
6 Claims. (Cl. 252—62.3)

This invention relates to methods of manufacturing aluminum phosphide crystals for use in semi-conductive devices, and to crystals and semi-conductive devices manufactured by the use of such methods.

It is already known to obtain the compound aluminum-phosphide by leading phosphorus vapor in a flow of hydrogen over fine-grained aluminum powder at about 500° C. The reaction product thus obtained is a slightly sintered, powdery mass containing, in addition to the compound aluminum-phosphide, an important amount of free aluminum, aluminum-oxide and aluminum-phosphate. In another known method of manufacturing aluminum-phosphide, fine filings from a rod of pure aluminum are heated in a vessel within an exhausted quartz envelope in phosphorus vapor. The vessel filled with aluminum was heated in an oven to about 1000° C., whereas the remaining part of the quartz envelope was maintained at 400° C. After heating for 72 hours, the resulting hard sintered product was pulverized in a mortar and again treated with phosphorus vapor under unvaried conditions. It was only after such a third treatment that the reaction product had changed almost completely to the compound aluminum-phosphide. By this known method the reaction product is also obtained in the pulverulent state.

In all known methods no crystals are obtained of a size such as required for use in semi-conductive devices. In addition, known methods of manufacturing the compound aluminum-phosphide can be carried out only with difficulty and take a comparatively long time of treatment.

An object of the present invention is inter alia to provide a method for the manufacture of aluminum-phosphide crystals, such as desired for use in semi-conductive devices, for example crystal diodes, which is very simple and efficacious.

According to the invention, for obtaining aluminum-phosphide, an oxygen-free atmosphere containing phosphorus vapor is caused to react with a coherent aluminum melt heated to a temperature between about 1100° C. and 1800° C., preferably between about 1300° C. and 1600° C., followed by cooling.

The reaction is preferably not carried out for so long a period that the aluminum is converted completely, since the crystals may then be isolated from the reaction product in an easier and simpler manner.

In one preferred embodiment of this method, for this purpose an oxygen-free flow of gas containing phosphorus vapor is led over the melt during the melting treatment. An atmosphere or a flow of gas from a mixture of phosphorus and hydrogen has been found to be very suitable for this purpose. Preferably, use is made of a vapor of phosphorus and hydrogen.

It has also been found very advantageous to use a compact aluminum body for producing the aluminum melt. The use of compact aluminum instead of pulverulent aluminum permits of substantially avoiding the contamination of aluminum-phosphide due to aluminum-oxide initially present, while the coherent melt is obtained in a simpler manner.

In another preferred embodiment of the invention, the aluminum is first heated in a phosphorus-free atmosphere, preferably in hydrogen, for producing the melt, whereupon the aluminum melt is exposed to the phosphorus containing atmosphere only after the aluminum has melted, i.e., at about 700° C., preferably only when a temperature of at least 1000° C. is reached. In fact, it has been found that a considerable delay in reaction occurs, more particularly a delay in setting in of the reaction between the aluminum melt and the phosphorus, which delay may be several hours, if the aluminum is in contact with the atmosphere of phosphorus straight from the beginning of the heating process. It is probable that hydrogen dissolved in the aluminum accelerates the reaction. However, this is considerably impeded if the phosphorus vapor is already led over the aluminum below the melting point thereof, since a coherent layer of aluminum phosphide may then form over the aluminum and bring about the said delay in reaction.

In another embodiment of the method according to the invention, during the melting treatment, foreign materials may at the same time be incorporated in order to act upon the electrical properties and more particularly to produce a desired conductivity or a desired type of conductivity. For this purpose, such active impurities may be added to the initial aluminum, or added to the atmosphere and introduced into the melt through the atmosphere. It has been found that the elements of the second group of the periodic table, more particularly zinc and cadmium, may be used as acceptors for producing p-type conductivity, and the elements of the sixth group of the periodic table, more particularly sulphur and selenium, may be used as donors for producing n-type conductivity. The element copper has also been found to be a suitable acceptor. Such activation of the compound aluminum-phosphide is advantageous more particularly in the manufacture of semi-conductive devices such, for example, as diodes, and permits of obtaining p-n transistions in an aluminum-phosphide crystal. Similarly, the method according to the invention also permits of manufacturing p-n recombination sources of radiation having an aluminum-phosphide crystal, in which the radiation is obtained by applying a forward voltage through a p-n transition in the crystal and in which the radiation produced by recombination of the charge carriers injected into the p-n transition or near the p-n transition emerges, at least in part, from the surface of the crystal near the p-n transition.

After cooling in the method according to the invention, a compact mass ensues from which the aluminum-phosphide crystals may be removed by mechanical means. In another embodiment of the method according to the invention, the aluminum-phosphide crystals are preferably obtained from the coagulation by chemical agency by treatment with 1,2-dibromoethane and/or homologous compounds such, for example, as 1,2-dibromopropane or 1,3-dibromopropane. In fact, it has been found that such compounds react with the aluminum, but do not react with the aluminum-phosphide.

In order that the invention may be readily carried into effect, it will now be described with reference to several examples.

*Example 1*

The initial material used was a compact aluminum rod weighing about 20 gms. and having a purity of 99.997%. This rod was introduced in a corundum vessel into a corundum tube which could be heated up by inserting the whole in a silicon-carbide tubular oven. In the cold state, the air in the device is expelled with the aid of dry hydrogen free from oxygen. Subsequently, the aluminum was heated to a high temperature in a flow of hydrogen. The rate of flow of the hydrogen was about 0.1 liter per minute. A coherent aluminum melt formed at about 700° C. At a temperature of about 1200° C. there was changed-over from hydrogen to phosphine with about the same rate of flow, namely about 0.1 liter per minute. The phosphine which is employed may be obtained from white phosphorus and potash lye, or from aluminum-phosphite and diluted sulphuric acid. After about one hour the oven reached a temperature of about 1500° C., at which the phosphine had dissociated almost completely into phosphorus and hdyrogen, and this atmosphere was allowed to act upon the aluminum for about 50 minutes at this temperature. The aluminum phosphide is formed with a reaction which can hardly be seen. When the gas flow leaving the reaction space entrained comparatively large amounts of phosphide and phosphorus vapor, the heating process was discontinued, and when the temperature had dropped in about 15 minutes to about 1100° C., there was changed over from the flow of phosphine to hydrogen, whereupon the whole was allowed further to cool down. Thus, a compact mass was obtained in the corundum vessel, which was covered with a thin layer of a grey to yellow color. Yellow aluminum-phosphide crystals could be ascertained at bulged areas on the surface. The main quantity of the crystals is present beneath the upper layer of the example. After breaking the vessel to pieces, the aluminum-phosphide crystals may be broken out of the sample, which still contains aluminum more particularly in the covering layer, by mechanical means, for example with the aid of forceps. However, a chemical method of isolation by treatment with 1,2-dibromoethane is particularly efficacious. For this purpose about 50 milliliters of 1,2-dibromoethane may be used per 10 mgs. of the phosphor-aluminum reaction product. Heating takes place until the reaction sets in, which may be seen from the development of gas which occurs and dark coloring of the 1,2-dibromoethane, followed by cooling so that the temperature in the reaction vessel does not exceed about 100° C. Preferably, the temperature is maintained between about 80° and 100° C. During reaction, the liquid becomes very dark of color and viscous. It is necessary to repeat the treatment several times dependent upon the amount of aluminum present. The remaining crystals are washed with dry acetone in order to remove the dark reaction products. Finally, the acetone may be expelled in a manner known per se, for example with the aid of toluene or xylene.

Aluminum-phosphide crystals are thus obtained which are, for example, of a size of about 8 x 5 x 1 mm.$^3$. The size of the crystals obtained may still be influenced by the velocity of coagulation, a lower velocity of coagulation resulting in large crystals.

The crystals are resistant except to moisture. When such crystals, which have not been activated intentionally, are scanned by means of a point contact, a marked rectifying effect is always found. However, the polarity of the rectification relating to one crystal has not been found to be constant. There are areas where the charge transport is effected predominantly by electrons and other areas where such is effected predominantly by holes. The p-n transitions present at the junction between such areas may be ascertained by P-N-photo-effects. A maximum spectral photo-sensitivity could be determined at about 5000 A., which indicates a distance between the bands of about 2.5 electron volts for aluminum-phosphide. This value was also confirmed by optical remission measurements. For these measurements the crystal was provided on a copper base with a silver paste and as the second electrode a tungsten point contact was used, with which the surface could be scanned in order to find sensitive areas near p-n junctions. Upon passing a current one could observe near the p-n transitions the p-n recombination radiation consisting of light of yellow, orange or red color.

*Example 2*

For the manufacture of p-type conductivity crystals of aluminum-phosphide the initial body of aluminum was alloyed with copper so that the copper concentration was about $10^{-2}$ at. percent. The process was otherwise similar to that described in Example 1. The resulting crystals of aluminum-phosphide had a homogenous p-type conductivity. One side of the crystals was provided on a metallic plate with the aid of silver paste, a point contact of tungsten being provided on the other side. From this ensued a marked rectifying effect, the forward direction corresponding to the negative polarity of the point. A rectification ratio of about $10^5$ was found.

*Example 3*

For the manufacture of p-type conductivity crystals of aluminum-phosphide, zinc or cadmium was incorporated in the crystals. Since the zinc and the cadmium evaporate almost completely from the aluminum at the high temperatures used during manufacture, no use was made of alloys of aluminum and zinc or aluminum and cadmium, but the zinc or the cadmium was added in a particular vessel and provided in the tube before the vessel containing the aluminum so that the carrier gas flows over this dope containing vessel before reacting the vessel with the aluminum. The temperature at this area was about 400° C. during the melting treatment. The vapor pressure of zinc or cadmium at this temperature is sufficient for obtaining p-type activation. The process was otherwise similar to that described in Example 1. Homogneous aluminum-phosphide crystals of p-type conductivity were obtained both with a zinc impurity and with a cadmium impurity showing a similar rectifying effect as mentioned in Example 2.

*Example 4*

For obtaining aluminum-phosphide crystals of n-type conductivity, one proceeds in a similar manner as described in Example 1, except that small amounts of $H_2S$ or $H_2Se$ were added to the flow of phosphine in a volume ratio of about 0.01% of the phosphine content. Homogenous n-type aluminum-phosphide crystals activated with sulphur or selenium were thus obtained. When provided on a copper substratum with the aid of silver paste and upon contacting with a further point contact electrode of tungsten, a marked rectifying effect was measured of the same order of magnitude as previously mentioned, the forward direction corresponding to the positive polarity of the point.

It is to be noted that, of course, several modifications of the method are possible within the scope of the invention. Thus, it is alternatively possible, for example, to carry out the reaction in a closed corundum tube. For this purpose use may be made of a corundum tube closed at one end, a glass tube being secured to the open end with the aid of a temperature-proof cement, which tube could be sealed off after having passed aluminum and phosphorus through it. The area at which the aluminum contained in a vessel is present in the tube is heated, for example, to about 1500° C. The remaining portion of the tube is heated to a temperature at which the phosphorus has the desired vapor pressure. This phosphorus vapor pressure may be chosen within wide limits. Preferably a high phosphorus pressure is chosen, the speed of reaction then being higher than that at lower pressures. In this arrangement it was possible to work with phosphorus vapor pressures higher than 10 atmospheres. In a particular example the temperature of the portion, at which the phosphorus was provided, was about 440° C. causing a phosphorus pressure in the tube of about 1500 Torr., and the heating at 1500° C. lasted about 50 minutes.

What is claimed is:

1. A method of making aluminum phosphide crystals for use in semiconductor devices, comprising the steps of establishing a melt of aluminum from a solid aluminum body free of phosphorus by heating the latter in a phosphorus-free, non-oxidizing atmosphere to a temperature of at least about 1000° C., thereafter heating said melt between about 1300° C. and 1600° C. in an oxygen-free atmosphere containing hydrogen and phosphorus vapor causing the phosphorus to react with the melt forming aluminum phosphide, cooling the melt before all of the aluminum is converted to aluminum phosphide producing grown aluminum phosphide crystals of relatively large size embedded in aluminum, and separating the aluminum phosphide crystals from the cooled product.

2. A method as set forth in claim 1 wherein phosphine is flowed over the melt to provide the oxygen-free atmosphere containing hydrogen and phosphorus vapor.

3. A method of making aluminum phosphide crystals for use in semiconductor devices, comprising the steps of establishing a melt of aluminum free of phosphorus from a solid body thereof and heating said melt at a temperature at least about 1000° C. in a non-oxidizing atmosphere, thereafter heating said melt between 1300° C. and 1600° C. in an oxygen-free atmosphere containing hydrogen and phosphorus causing the phosphorus to react with the melt forming aluminum phosphide, cooling the melt before all of the aluminum is converted to aluminum phosphide producing grown aluminum phosphide crystals of relatively large size embedded in aluminum, reacting the cooled product with a liquid substance selected from the group consisting of 1,2-dibromethane and homologs thereof which coagulates upon reaction with the aluminum, and separating the aluminum phosphide crystals from the coagulated mass.

4. A method as set forth in claim 3 wherein an element selected from the group consisting of zinc and cadmium is provided in a vessel, after which the aluminum is melted in the vessel, to produce p-type crystals.

5. A method as set forth in claim 3 wherein copper is first alloyed with the solid aluminum body before it is melted to produce p-type crystals.

6. A method as set forth in claim 3 wherein a gas selected from the group consisting of $H_2S$ and $H_2Se$ is added to the atmosphere to produce n-type crystals.

References Cited in the file of this patent

UNITED STATES PATENTS

| | | |
|---|---|---|
| 2,798,989 | Welker | July 9, 1957 |
| 2,858,275 | Otto-Gert Folberth | Oct. 28, 1958 |
| 2,900,286 | Goldstein | Aug. 18, 1959 |
| 2,921,905 | Hung Chi Chang | Jan. 19, 1960 |
| 2,928,761 | Gremmelmaier et al. | Mar. 15, 1960 |
| 2,944,975 | Folberth | July 12, 1960 |
| 2,990,372 | Pinter et al. | June 27, 1961 |
| 3,007,816 | McNamara | Nov. 7, 1961 |
| 3,021,196 | Merkel | Feb. 13, 1962 |

OTHER REFERENCES

Billig: Growth of Monocrystals of Germanium From an Undercooled Melt, Proceedings Royal Society, A, vol. 229, pp. 346–363, 1955, pp. 354 and 355 relied upon.